United States Patent
Hsu et al.

(10) Patent No.: US 10,012,874 B2
(45) Date of Patent: *Jul. 3, 2018

(54) DISPLAY PANEL AND DISPLAY DEVICE (71) Applicant: INNOLUX CORPORATION, Jhu-Nan, Miao-Li County (TW)

(72) Inventors: Yu-Lun Hsu, Jhu-Nan (TW); Chao-Hsiang Wang, Jhu-Nan (TW); An-Chang Wang, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 22 days.

This patent is subject to a terminal disclaimer.

(21) Appl. No.: 15/216,308

(22) Filed: Jul. 21, 2016

(65) Prior Publication Data

US 2016/0327837 A1 Nov. 10, 2016

Related U.S. Application Data (63) Continuation of application No. 14/298,510, filed on Jun. 6, 2014, now Pat. No. 9,424,794.

(51) Int. Cl.
*G09G 3/36* (2006.01)
*G02F 1/1343* (2006.01)
(Continued)

(52) U.S. Cl.
CPC ...... *G02F 1/134309* (2013.01); *G02F 1/1368* (2013.01); *G02F 1/133345* (2013.01);
(Continued)

(58) Field of Classification Search
CPC ............... G09G 3/3659; G09G 3/3406; G09G 2320/062; G09G 2320/103;
(Continued)

(56) References Cited

U.S. PATENT DOCUMENTS 5,831,707 A 11/1998 Ota et al.
6,317,188 B1 11/2001 Shibahara
(Continued)

FOREIGN PATENT DOCUMENTS

JP 2008-76978 4/2008
JP 2008-191669 8/2008
JP 2010-271442 12/2010

OTHER PUBLICATIONS

Report of Utility Model Technical Opinion issued by the Japan Patent Office for corresponding Japanese Utility Model Application No. 2014-003311 on Mar. 22, 2016.

Primary Examiner — Vinh T Lam
(74) Attorney, Agent, or Firm — Liu & Liu (57) ABSTRACT

A display panel comprises a first substrate, a second substrate disposed opposite to the first substrate, a liquid crystal layer disposed between the first and second substrates, and a pixel array disposed on the first substrate and including at least one pixel, which includes a first electrode layer, a second electrode layer and an insulation layer disposed between the first and second electrode layers. The second electrode layer has n electrode portions, the electrode portions are spaced from each other and disposed along a first direction, an electrode width of one of the electrode portions along the first direction is denoted by W (μm), the maximum width of a light-emitting area of the pixel along the first direction is denoted by Ax (μm), and the equation is satisfied as below:

$$\frac{1}{2} \times \left( \sqrt{\frac{10 \times Ax}{3 \times W}} - 1 \right) - 1 \leq n \leq \frac{1}{2} \times \left( \sqrt{\frac{10 \times Ax}{3 \times W}} - 1 \right) + 1$$

(Continued)

wherein, n is a positive integer, $0.05 < R < 0.1$, and a unit of W and Ax is µm.

14 Claims, 12 Drawing Sheets

(51) Int. Cl.
| | |
|---|---|
| *G09G 3/34* | (2006.01) |
| *G02F 1/1333* | (2006.01) |
| *G02F 1/1335* | (2006.01) |
| *G02F 1/1362* | (2006.01) |
| *G02F 1/1368* | (2006.01) |

(52) U.S. Cl.
CPC .. *G02F 1/133512* (2013.01); *G02F 1/133514* (2013.01); *G02F 1/134363* (2013.01); *G02F 1/136286* (2013.01); *G09G 3/3406* (2013.01); *G09G 3/3659* (2013.01); *G02F 2201/121* (2013.01); *G02F 2201/123* (2013.01); *G09G 2320/062* (2013.01); *G09G 2320/0626* (2013.01); *G09G 2320/103* (2013.01); *G09G 2360/16* (2013.01)

(58) Field of Classification Search
CPC ........ G09G 2320/0626; G09G 2360/16; G02F 1/134309; G02F 1/134363; G02F 1/1368; G02F 1/136286; G02F 1/133514; G02F 1/133512; G02F 1/133345; G02F 2201/123; G02F 2201/12
USPC .................... 345/38, 50–54, 60, 64, 87–104; 349/61–67, 73–85, 96–112, 117–147, 173
See application file for complete search history.

(56) References Cited

U.S. PATENT DOCUMENTS

| | | | |
|---|---|---|---|
| 6,469,765 | B1 | 10/2002 | Matsuyama et al. |
| 7,782,346 | B2 * | 8/2010 | Akiyama ........... G02F 1/134309 345/50 |
| 8,599,225 | B2 * | 12/2013 | Jung ..................... G09G 3/3426 345/102 |
| 8,692,961 | B2 | 4/2014 | Yonemura |
| 8,730,560 | B2 | 5/2014 | Sonoda |
| 8,882,326 | B2 * | 11/2014 | Kikuchi ............... G02B 6/0068 349/62 |
| 9,053,666 | B2 | 6/2015 | Minami |
| 2006/0050081 | A1 | 3/2006 | Kobayashi |
| 2007/0152934 | A1 * | 7/2007 | Maeda ................. G09G 3/3233 345/92 |
| 2007/0236424 | A1 | 10/2007 | Kimura |
| 2008/0018563 | A1 | 1/2008 | Shinohe |
| 2008/0143649 | A1 | 6/2008 | Asaki |
| 2009/0284518 | A1 * | 11/2009 | Sawabe ............. G02F 1/133528 345/213 |
| 2009/0315821 | A1 | 12/2009 | Kwak |
| 2010/0007282 | A1 | 1/2010 | Yamamoto |
| 2010/0309419 | A1 | 12/2010 | Oka et al. |
| 2011/0096065 | A1 | 4/2011 | Handa |
| 2011/0169719 | A1 | 7/2011 | Onishi |
| 2012/0013647 | A1 | 1/2012 | Fang |
| 2012/0013649 | A1 | 1/2012 | Higashi |
| 2012/0105503 | A1 | 5/2012 | Tada |
| 2012/0274617 | A1 | 11/2012 | Fukuda |
| 2013/0027441 | A1 | 1/2013 | Kabe |

* cited by examiner

DISPLAY PANEL AND DISPLAY DEVICE

CROSS REFERENCE TO RELATED APPLICATIONS

This Non-provisional application is a Continuation Application (CA) of an earlier filed, pending, application, having application Ser. No. 14/298,510 and filed on Jun. 6, 2014, wherein the contents thereof, including drawings, are expressly incorporated by reference herein.

BACKGROUND OF THE INVENTION

Field of Invention

The invention relates to a display panel and a display device and, in particular, to a display panel and a display device having a higher transmittance.

Related Art

With the progress of technologies, display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

A conventional liquid crystal display (LCD) apparatus mainly includes an LCD panel and a backlight module disposed opposite to the LCD panel. The LCD panel mainly includes a thin film transistor (TFT) substrate, a color filter (CF) substrate and a liquid crystal layer disposed between the two substrates. The CF substrate, the TFT substrate and the LC layer can form a plurality of pixel units disposed in an array. The backlight module emits the light passing through the LCD panel, and the pixel units of the LCD panel can display images accordingly.

For the same luminance, a display panel with a higher transmittance can save more energy for the display device. Therefore, the industry strives to increase the transmittance of the display panel to save more energy and enhance the product competitiveness.

SUMMARY OF THE INVENTION

An objective of the invention is to provide a display panel and a display device having a higher transmittance so as to enhance the product competitiveness.

To achieve the above objective, a display panel according to the invention comprises a first substrate, a second substrate disposed opposite to the first substrate, a liquid crystal layer disposed between the first and second substrates, and a pixel array disposed on the first substrate and including at least one pixel, which includes a first electrode layer, a second electrode layer and an insulation layer disposed between the first and second electrode layers. The second electrode layer has n electrode portions, the electrode portions are spaced from each other and disposed in parallel along a first direction, an electrode width of one of the electrode portions along the first direction is denoted by W (μm), the maximum width of a light-emitting area of the pixel along the first direction is denoted by Ax (μm), and the equation is satisfied as below:

$$\frac{1}{2} \times \left(\sqrt{\frac{10 \times Ax}{3 \times W}} - 1\right) - 1 \leq n \leq \frac{1}{2} \times \left(\sqrt{\frac{10 \times Ax}{3 \times W}} - 1\right) + 1$$

wherein, n is a positive integer, and the unit of W and Ax is μm.

To achieve the above objective, a display device according to the invention comprises a display panel. The display panel includes a first substrate, a second substrate disposed opposite to the first substrate, a liquid crystal layer disposed between the first and second substrates, and a pixel array disposed on the first substrate and including at least one pixel, which includes a first electrode layer, a second electrode layer and an insulation layer disposed between the first and second electrode layers. The second electrode layer has n electrode portions, the electrode portions are spaced from each other and disposed in parallel along a first direction, an electrode width of one of the electrode portions along the first direction is denoted by W (μm), the maximum width of a light-emitting area of the pixel along the first direction is denoted by Ax (μm), and the equation is satisfied as below:

$$\frac{1}{2} \times \left(\sqrt{\frac{10 \times Ax}{3 \times W}} - 1\right) - 1 \leq n \leq \frac{1}{2} \times \left(\sqrt{\frac{10 \times Ax}{3 \times W}} - 1\right) + 1$$

wherein, n is a positive integer, and the unit of W and Ax is μm.

In one embodiment, when a light passes through the pixel, the pixel has a brightness distribution along the first direction, and the maximum width of the light-emitting area of the pixel along the first direction is the full width at half maximum (FWHM) of the brightness distribution.

In one embodiment, the pixel further includes a scan line, and the first direction is substantially parallel to the direction of the scan line.

In one embodiment, the second electrode layer further includes a first connecting portion, which surrounds the electrode portions and is connected to the electrode portions.

In one embodiment, the second electrode layer further includes a second connecting portion, which is disposed on the opposite sides of the electrode portions and connected to the electrode portions.

As mentioned above, in the display panel and display device of the invention, the pixel array includes at least a pixel, and the insulation layer of the pixel is disposed between the first electrode layer and the second electrode layer. The second electrode layer has n electrode portions. The electrode portions are spaced from each other and disposed in parallel along the first direction, and the electrode width of one of the electrode portions along the first direction is denoted by W. The maximum width of the light-emitting area of the pixel along the first direction is denoted by Ax. The equation is satisfied as below:

$$\frac{1}{2} \times \left(\sqrt{\frac{10 \times Ax}{3 \times W}} - 1\right) - 1 \leq n \leq \frac{1}{2} \times \left(\sqrt{\frac{10 \times Ax}{3 \times W}} - 1\right) + 1$$

wherein, n is a positive integer.

Accordingly, when the number (n) of the electrode portions of the second electrode layer, the electrode width (W) and the maximum width (Ax) of the light-emitting area of the pixel along the first direction comply with the above equation, the ratio of the dark area of the pixel can be minimized so as to obtain the maximum transmittance of the pixel. Therefore, the display panel and the display device of the invention can have a higher transmittance and the product competitiveness can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
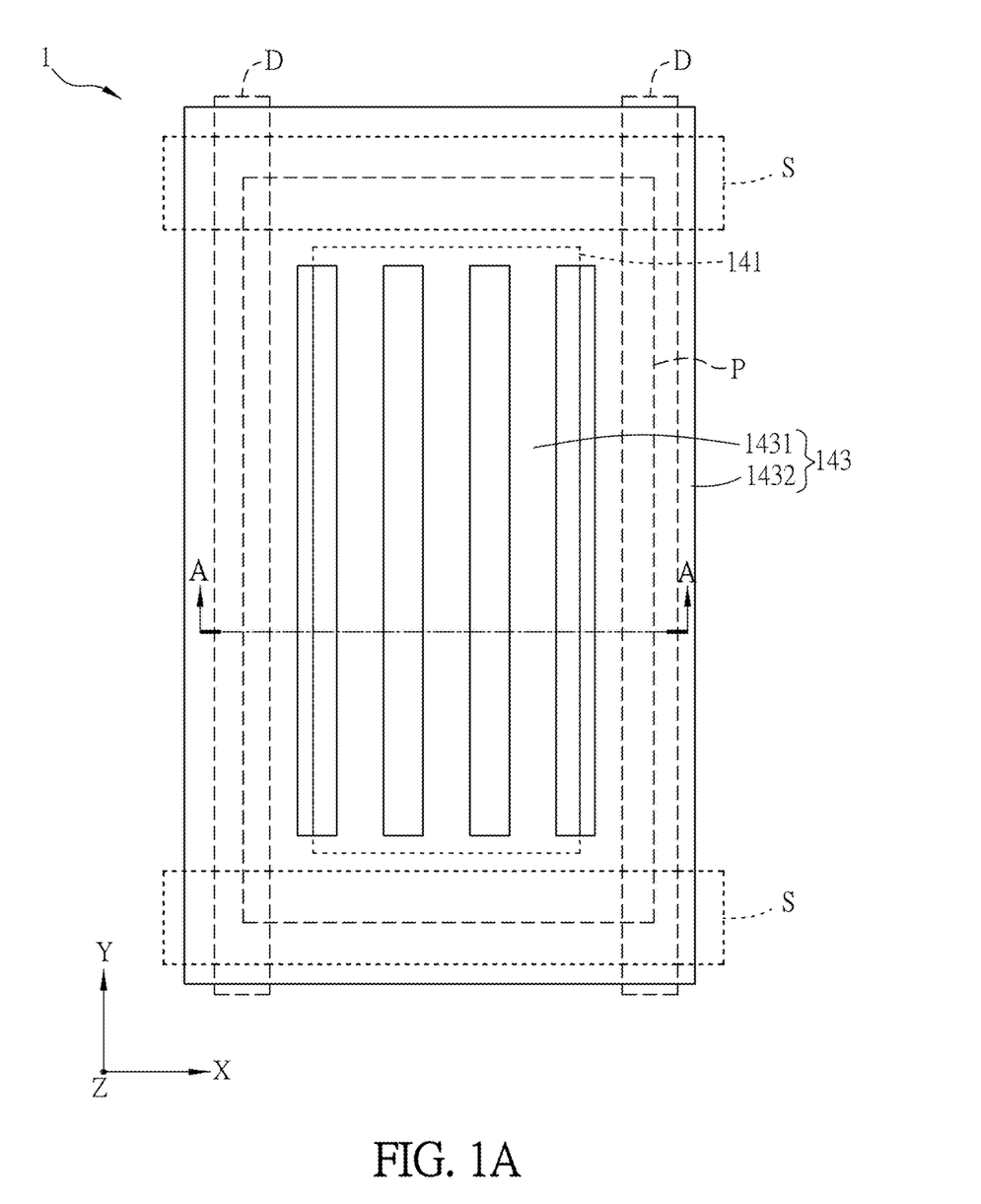
FIG. 1A is a schematic diagram of a pixel of a display panel according to an embodiment of the invention.
Figure 1B:
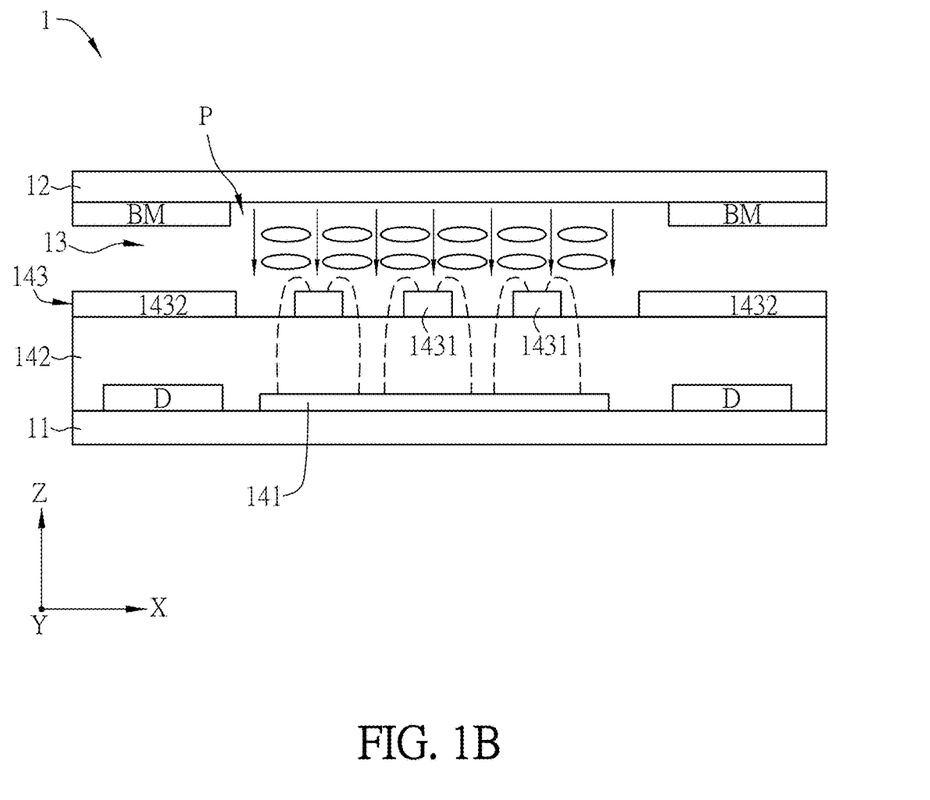
FIG. 1B is a schematic sectional diagram taken along the line A-A in FIG. 1A.
Figure 1C:
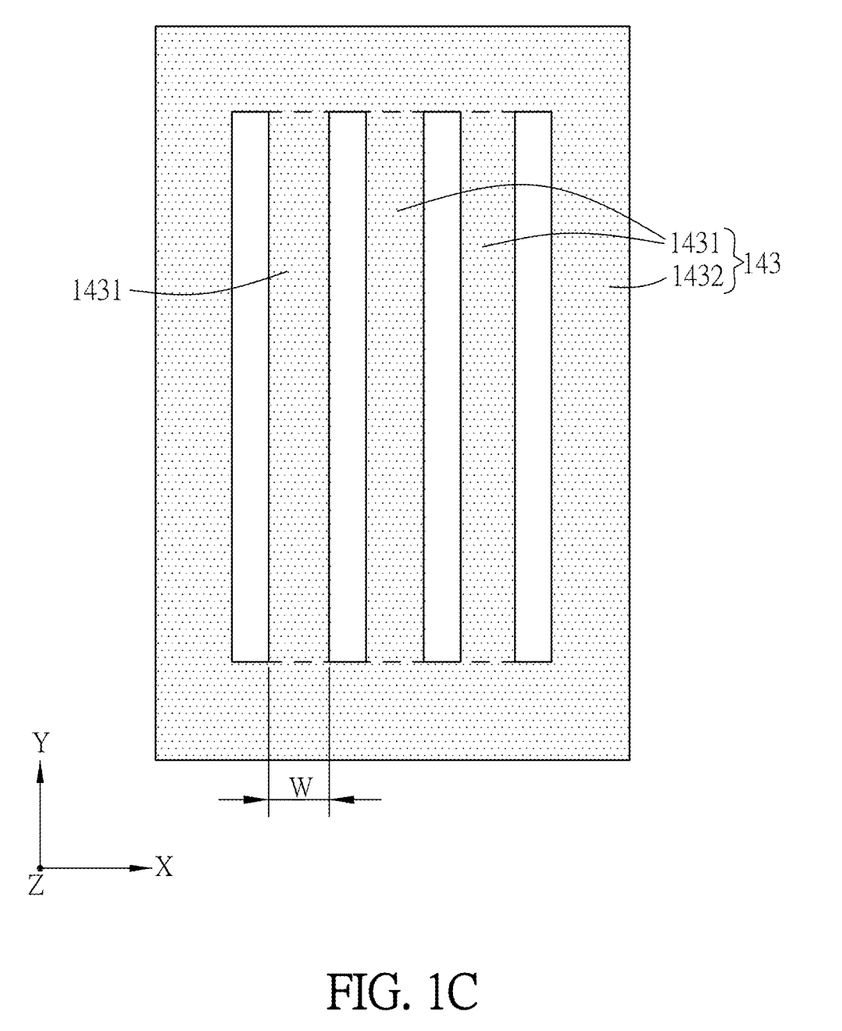
FIG. 1C is a schematic diagram of a second electrode layer in FIG. 1B.

FIG. 1A is a schematic diagram of a pixel P of a display panel 1 according to an embodiment of the invention, FIG. 1B is a schematic sectional diagram taken along the line A-A in FIG. 1A, and FIG. 1C is a schematic diagram of a second electrode layer 143 in FIG. 1B. The display panel 1 is, for example but not limited to, a fringe field switching (FFS) display panel, or may be another kind of display panel with a horizontal driving method. For helping understanding, FIG. 1A just shows two scan lines S, two data lines D, a pixel P, a first electrode layer 141 and a second electrode layer 143 of the display panel 1, and other elements are not shown. Besides, in this embodiment, a first direction X (horizontal direction), a second direction Y (vertical direction) and a third direction Z are shown in FIGS. 1A and 1B, and they are perpendicular to one another. The first direction X is substantially parallel to the direction of the scan line S, the second direction Y is substantially parallel to the direction of the data line D, and the third direction Z is perpendicular to the first direction X and the second direction Y.

As shown in FIGS. 1A to 1C, the display panel 1 includes a first substrate 11, a second substrate 12 and a liquid crystal layer 13. The first substrate 11 and the second substrate 12 are disposed oppositely, and the liquid crystal layer 13 is disposed between the first and second substrates 11 and 12. Each of the first substrate 11 and the second substrate 12 is made by a transparent material, and can be a glass substrate, a quartz substrate or a plastic substrate for example.

The display panel 1 further includes a pixel array, which is disposed on the first substrate 11 and has at least a pixel P. In this embodiment, the pixel array includes a plurality of pixels, which are disposed between the first and second substrates 11 and 12 and in an array along the first and second directions X and Y. Besides, the display panel 1 can further include a plurality of scan lines S and a plurality of data lines D, and the scan lines S and the data lines D cross each other to define the area of the pixel array.

As shown in FIG. 1B, the pixel P includes a first electrode layer 141, an insulation layer 142 and a second electrode layer 143. In this embodiment, the first electrode layer 141, the insulation layer 142 and the second electrode layer 143 are disposed on the side of the first substrate 11 facing the second substrate 12 sequentially from bottom to top. The data lines D and the first electrode layers 141 are disposed on the first substrate 11. Herein, the first electrode layer 141 is disposed within the two adjacent data lines D and within the two adjacent scan lines S.

The insulation layer 142 covers the first electrode layer 141 and the data line D, and the second electrode layer 143 is disposed on the insulation layer 142. Herein, the insulation layer 142 is disposed between the first electrode layer 141 (with the data line D) and the second electrode layer 143 to separate the first electrode layer 141, the data line D and the second electrode layer 143 for avoiding a short circuit. The material of the insulation layer 142 may include SiOx, SiNx or the like, but the invention is not limited thereto. Each of the first and second electrode layers 141 and 143 is a transparent conductive layer, and the material thereof may include indium tin oxide (ITO) for example. In this embodiment, the first electrode layer is a pixel electrode and electrically connected to the data line D, and the second elector delayer 143 is a common electrode. In other embodiments, however, the first electrode layer 141 can be a common electrode while the second electrode layer 143 is a pixel electrode.

The second electrode layer 143 includes n electrode portions 1431 (n is a positive integer), and further includes a first connecting portion 1432 that surrounds the electrode portions 1431 and is connected to the electrode portions 1431. Herein as shown in FIG. 1C, the number (n) of the electrode portions 1431 is 3, and the first connecting portion 1432 is disposed around and connected to the three electrode portions 1431. The electrode portions 1431 are spaced from each other and disposed in parallel along the first direction X. The electrode width of one of the electrode portions of the second electrode layer 143 is denoted by W. The electrode width W has the range complying with 1 µm≤W≤5 µm for example and with 1.5 µm≤W≤3.5 µm favorably.

As shown in FIG. 1B, the display panel 1 can further include a black matrix BM and a filter layer (not shown). The black matrix BM is disposed on the first substrate 11 or the second substrate 12 and corresponding to the data lines D. The black matrix BM is made by opaque material, which includes metal (e.g. Cr, chromium oxide, or Cr—O—N compound) or resin for example. In this embodiment, the black matrix BM is disposed on the side of the second substrate 12 facing the first substrate 11 and over the data line D along the third direction Z. Accordingly, the black matrix BM covers the data lines D in a top view of the display panel 1.

The filter layer (not shown) is disposed on the side of the second substrate 12 and the black matrix BM facing the first substrate 11 or disposed on the first substrate 11. Since the black matrix BM is opaque, a corresponding opaque area can be formed on the second substrate 12 so as to define a transparent area. Therefore, when the light passes through the pixel P, the pixel P will have a light-emitting area (the area permeable to light). The black matrix BM includes a plurality of light-blocking segments, and at least one light-blocking segment is disposed between two adjacent filter portions of the filter layer. In this embodiment, the black matrix BM and the filter layer are both disposed on the second substrate 12. In other embodiments, however, the black matrix BM or the filter layer can be disposed on the first substrate 11 for making a BOA (BM on array) substrate or a COA (color filter on array) substrate. To be noted, the above-mentioned structure of the substrate is just for example but not for limiting the scope of the invention. Moreover, the display panel 1 can further include a protection layer (e.g. over-coating, not shown), which can cover the black matrix BM and the filter layer. The protection layer can include photoresist material, resin material or inorganic material (e.g. SiOx/SiOx), protecting the black matrix BM and the filter layer from being damaged during the subsequent processes.

When the scan lines S of the display panel 1 receive a scan signal sequentially, the TFT (not shown) corresponding to each of the scan lines S can be enabled. Then, the data signals can be transmitted to the corresponding pixel electrodes through the data lines D and the display panel 1 can display images accordingly. In this embodiment, the gray-level voltage can be transmitted to the first electrode layer 141 (pixel electrode) of each of the pixels P through each of the data lines D, and an electric filed can be thus formed between the first electrode layer 141 and the second electrode layer 143 (common electrode) to drive the LC molecules of the LC layer 13 to rotate on the plane that is in the first and second directions X and Y. Therefore, the light can be modulated and the display panel 1 can display images accordingly.

However, when the electric field is formed between the first electrode layer 141 and the second electrode layer 143 (common electrode) to drive the LC molecules to rotate, the horizontal rotation of the LC molecules in the central area of each of the electrode portions 1431 and in the area between the adjacent electrode portions 1431 is limited because of the electric field distribution (denoted by the dotted lines in FIG. 1B) in the said areas. Hence, when the light passes through the pixel P, the dark regions will be generated in the central area of each of the electrode portions 1431 and in the area between the adjacent electrode portions 1431, reducing the transmittance of the display panel 1. So, decreasing the said area of the dark regions indicates the increment of the transmittance of the display panel 1, and the increment of the transmittance indicates the energy can be saved and the product competitiveness can be enhanced.

Figure 2A:
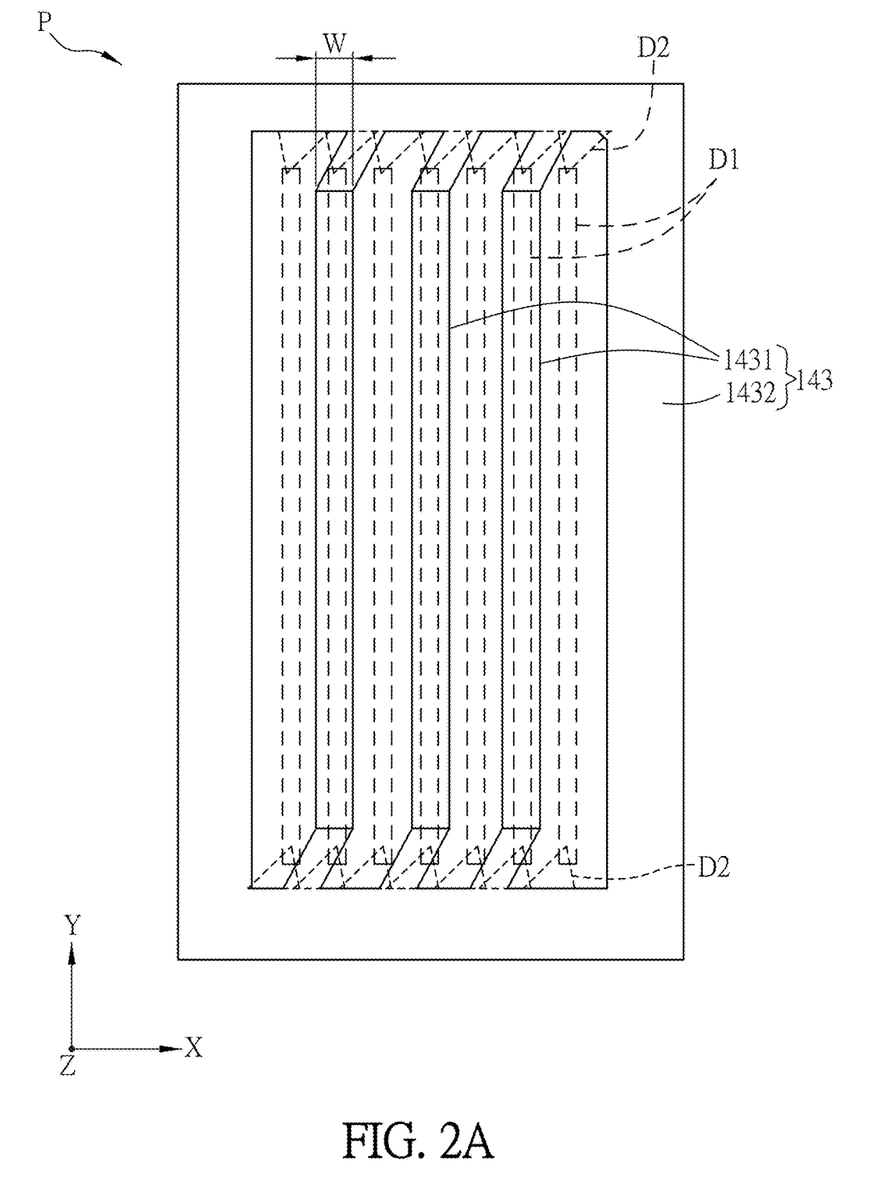
FIG. 2A is a schematic diagram showing the relative position between the second electrode layer and the dark regions of the pixel of the display panel in FIG. 1A.
Figure 2B:
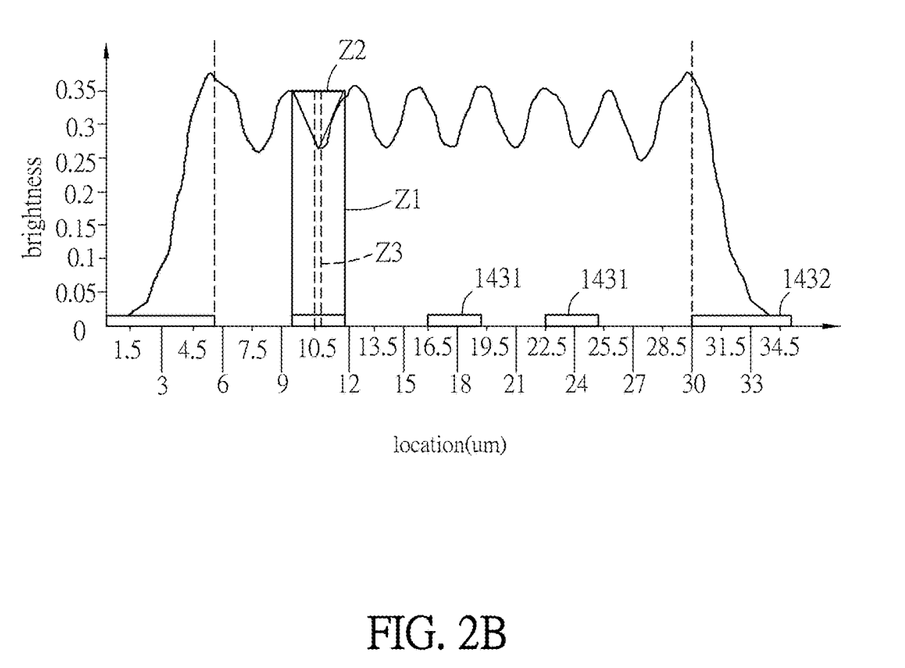
FIG. 2B is a schematic diagram showing the relation between the brightness and the second electrode layer of the pixel.
Figure 2C:
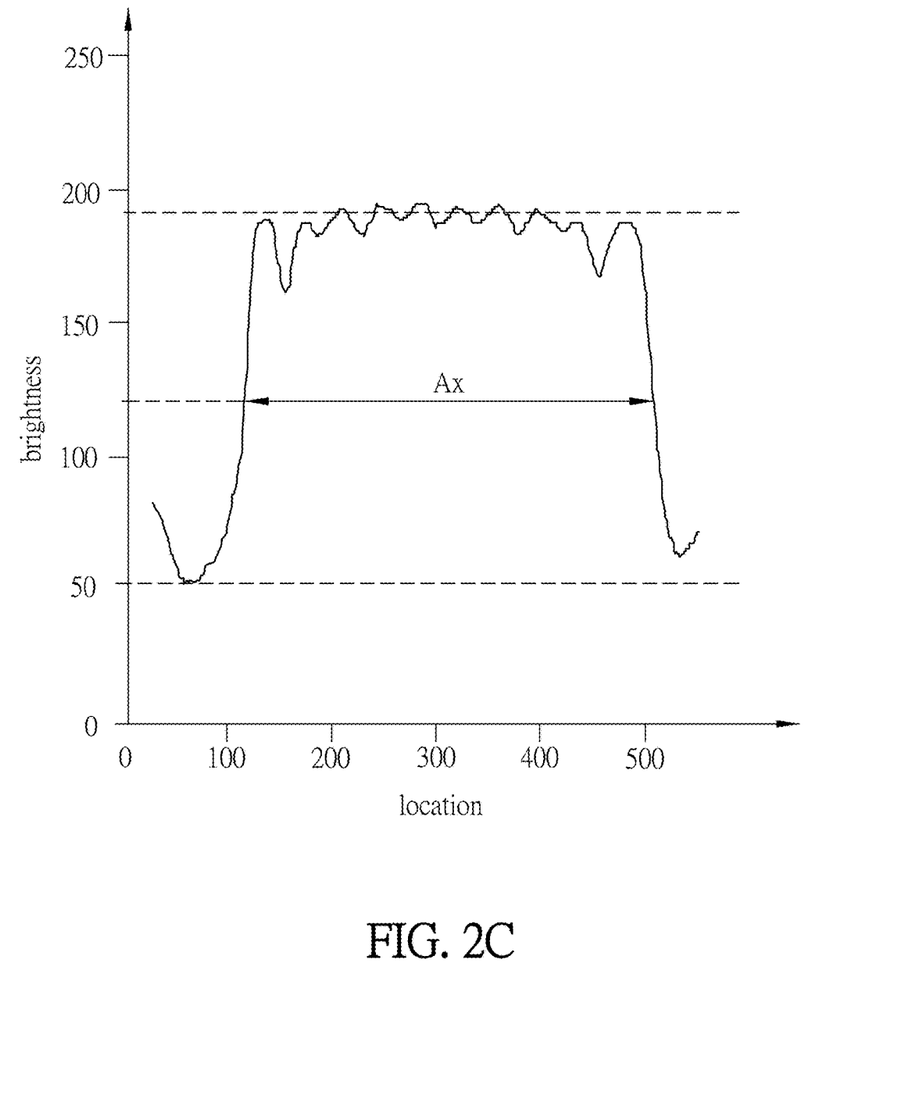
FIG. 2C is a schematic diagram showing the brightness distribution along the first direction of the pixel in FIG. 2A.
Figure 2D:
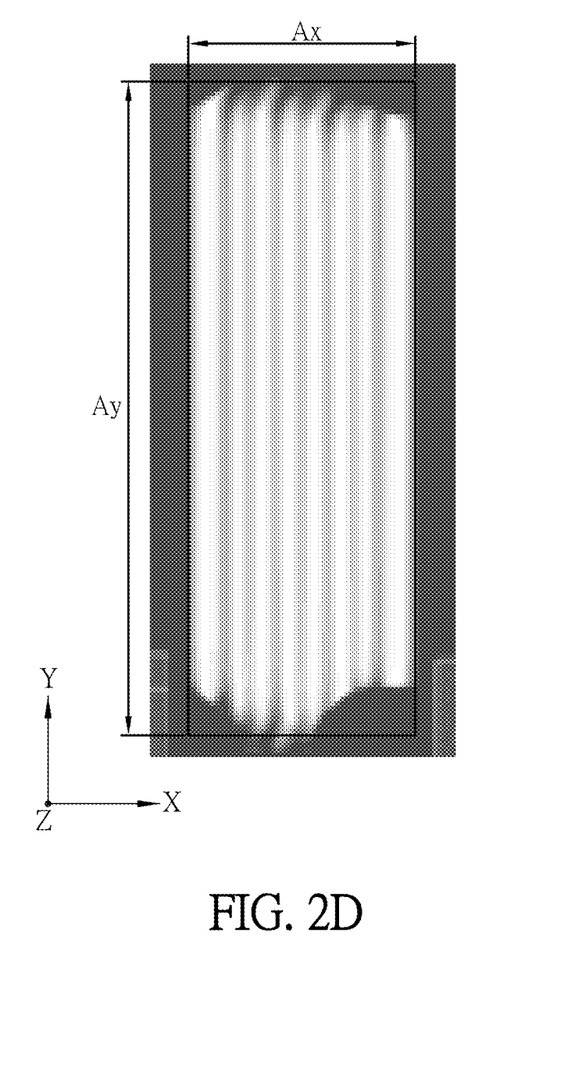
FIG. 2D is a schematic image diagram of the pixel of the display panel in FIG. 1A.

Accordingly, how to minimize the area of the dark regions to increase the transmittance of the display panel 1 will be illustrated as below by referring to FIGS. 2A to 2D. FIG. 2A is a schematic diagram showing the relative position between the second electrode layer 143 and the dark regions of the pixel P of the display panel 1 in FIG. 1A, FIG. 2B is a schematic diagram showing the relation between the brightness (e.g. luminance) and the second electrode layer 143 of the pixel P, FIG. 2C is a schematic diagram showing the brightness distribution along the first direction X of the pixel P in FIG. 2A, and FIG. 2D is a schematic image diagram of the pixel P of the display panel 1 in FIG. 1A. Herein as shown in FIG. 2D, when the light passes through the pixel P, the pixel P will have a light-emitting area, the maximum width of which along the first direction X is denoted by Ax (e.g. 10 μm≤Ax≤250 μm) and the maximum width of which along the second direction Y is denoted by Ay (e.g. Ay≈3Ax). So, the total area of the light-emitting area is denoted by the product of Ax and Ay. Moreover, the dotted lines in FIG. 2A denote the dark regions generated when the light passes through the pixel P, and the dark regions include straight dark regions D1 and triangular dark regions D2. The wave trough of the brightness curve in FIG. 2B denotes the location of the dark region. Furthermore, as shown in FIG. 2C, the maximum width Ax of the light-emitting area along the first direction X is defined as the full width at half maximum (FWHM) of the brightness distribution curve of the pixel P along the first direction X.

As shown in FIG. 2A, when the light passes through the dark regions of the pixel P, the number of the straight dark regions D1 is 2n+1 (that is 7 for n=3 here) since the number of the electrode portions 1431 of the second electrode layer 143 in this embodiment is 3 (n). Besides, for the actual layout of the second electrode layer 143, the connection portions (i.e. the upper and lower edges of the pixel P along the second direction Y) of two sides of the electrode portion 1431 and the first connecting portion 1432 can have a turning each, and a triangular dark region D2 will occur at the turning, between the two turnings and between the turning and the first connecting portion 1432, so the number of the triangular dark regions is 2*(2n+1) (i.e. 2*7=14 in this embodiment). From FIG. 2A, when the total area of the straight and triangular dark regions D1 and D2 is minimized relative to the total area of the light-emitting area, the transmittance of the pixel P can be maximized.

As shown in FIG. 2B, by taking the left side electrode portion 1431 as an example, the total brightness energy of the electrode portion 1431 is denoted by the rectangular area Z1 bounded by the solid line (i.e. the integral of the brightness distribution curve under the condition without any dark region), and the brightness loss due to the dark regions is approximately denoted by the triangular area Z2 bounded by the solid line (i.e. the integral of the indented portion of the brightness distribution curve). The triangular area Z2 representing the brightness loss can be equalized as a rectangular area Z3 with the same height as the rectangular area Z1 (i.e. Z2 is equivalent to the area Z3), so the ratio of the triangular area Z2 (the brightness loss) to the total brightness energy (without any dark region) of the electrode portion 1431 is equivalent to the ratio (R) of the width of the area Z3 (the width of the dark region) to the width of the area Z1 (the width of the electrode portion 1431). By the actual measuring and calculation, the ratio R is about 0.1 (R≈0.1, that is to say the width of the area Z3 is about 0.1 times the width of the area Z1). In other embodiments, the ratio R can be 0.05~0.5 (0.05≤R≤0.5).

Hence, the transparent area T of the pixel P can be obtained by subtracting the area of the dark regions (including the triangular dark regions D2 and the straight dark regions D1) from the area of the light-emitting area, as the following equation:

$$T = Ax \times Ay - 2 \times (2n+1) \times \frac{1}{2} \times \left(\frac{Ax}{(2n+1)}\right)^2 - (2n+1) \times W \times R \times Ay$$

$$= Ax \times Ay - \frac{Ax^2}{(2n+1)} - (2n+1) \times W \times R \times Ay$$

To obtain the maximum, the differential is derived from the equation as below:

$$\frac{\partial T}{\partial n} = \frac{\partial T}{\partial (2n+1)} \times \frac{\partial (2n+1)}{\partial n}$$

Then, the equation can be obtained as below:

$$T' = (2n+1)^{-2} \times Ax^2 \times 2 - W \times R \times Ay \times 2$$

When T=0, the maximum exists, so the equation becomes:

$$n = \frac{1}{2} \times \left(\sqrt{\frac{Ax^2}{W \times R \times Ay}} - 1\right)$$

By substituting Ay≈3Ax into the above equation, the equation becomes:

$$n = \frac{1}{2} \times \left(\sqrt{\frac{Ax}{3 \times W \times R}} - 1\right)$$

Again, by substituting R≈0.1 into the above equation, the equation becomes:

$$n = \frac{1}{2} \times \left(\sqrt{\frac{10 \times Ax}{3 \times W}} - 1\right)$$

Accordingly, the optimized n (positive integer) in this embodiment will comply with the following equation:

$$\frac{1}{2} \times \left(\sqrt{\frac{10 \times Ax}{3 \times W}} - 1\right) - 1 \leq n \leq \frac{1}{2} \times \left(\sqrt{\frac{10 \times Ax}{3 \times W}} - 1\right) + 1$$

In this condition, the ratio of the area of the dark regions to the area of the light-emitting area of the pixel P can be minimized so as to obtain the maximum transmittance of the pixel P, and therefore the display panel 1 is configured with a higher transmittance and the product competitiveness can be increased.

Figure 3A:
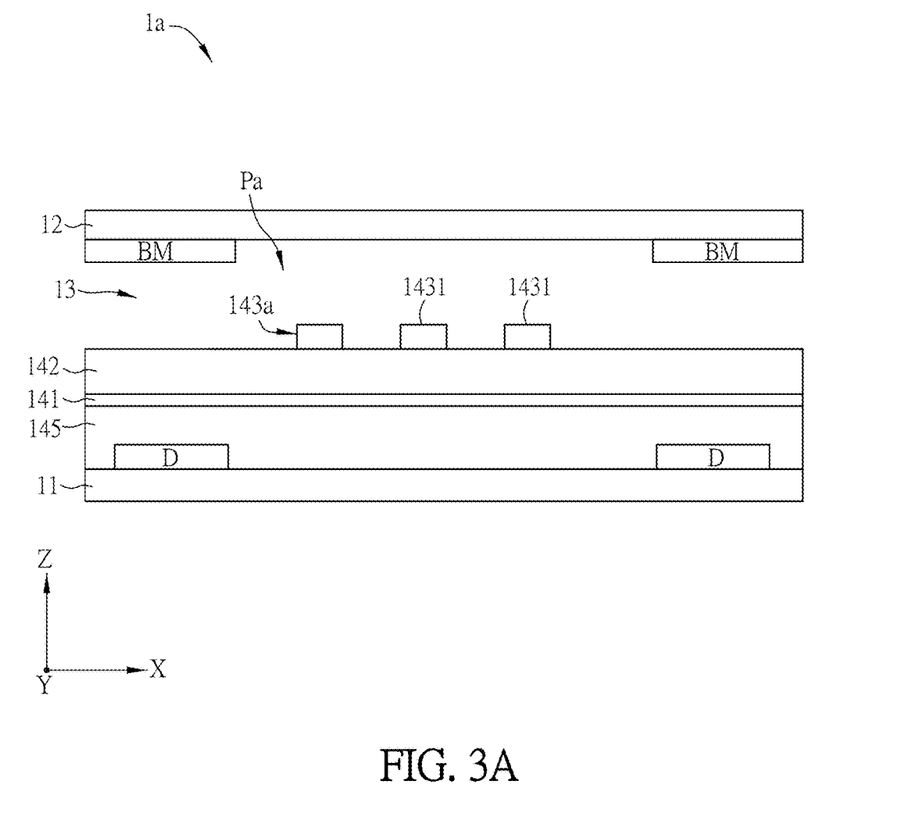
FIG. 3A is a schematic sectional diagram of a display panel according to another embodiment of the invention.
Figure 3B:
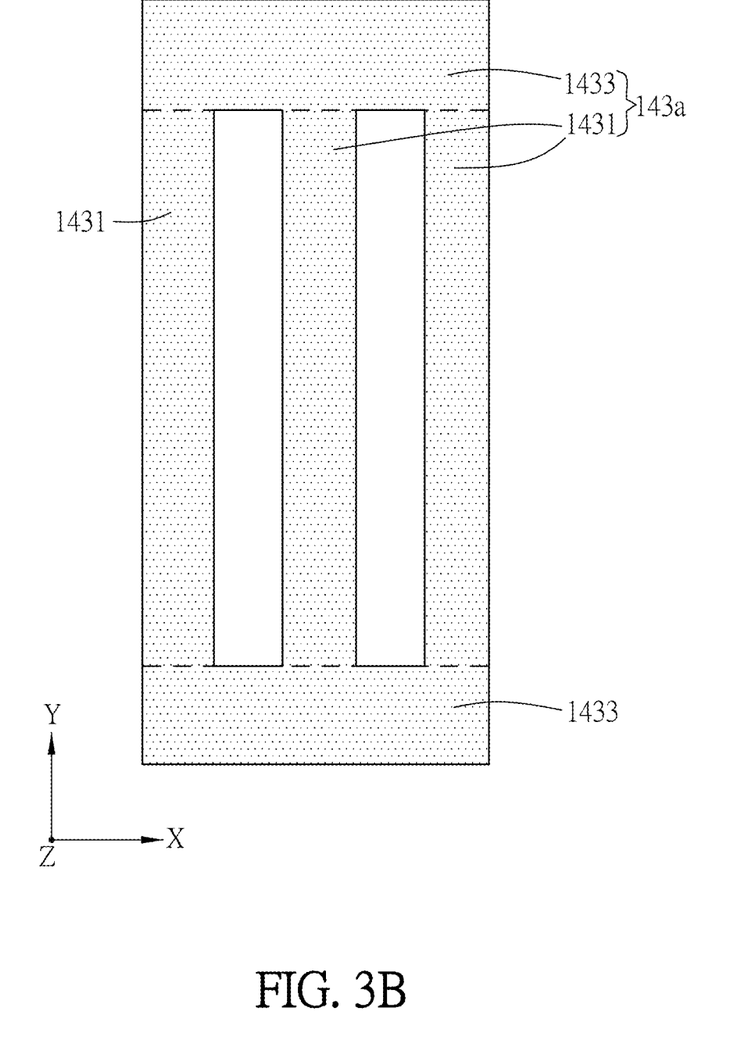
FIG. 3B is a schematic diagram of the second electrode layer of the display panel in FIG. 3A.
Figure 3C:
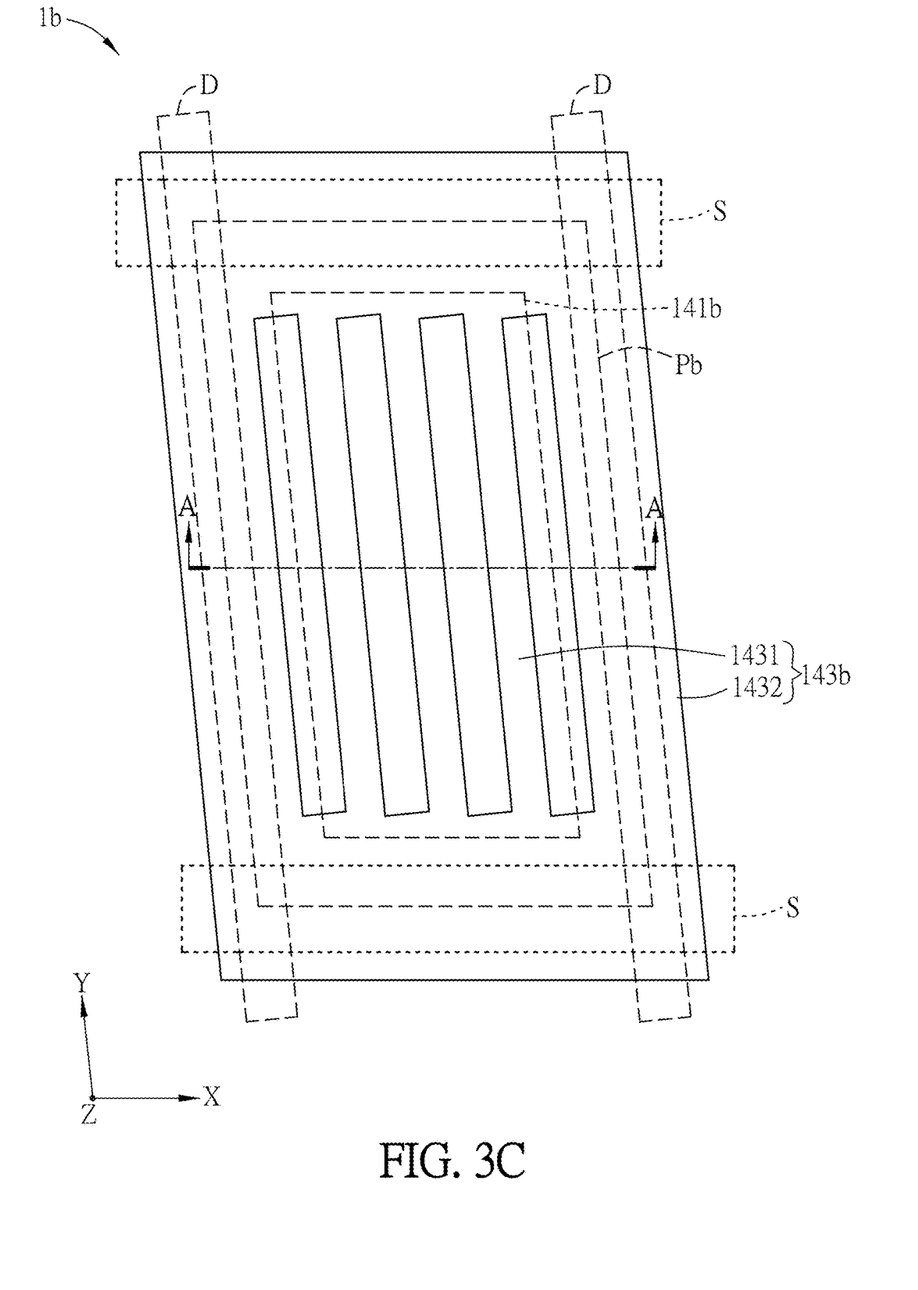
FIG. 3C is a schematic diagram of a pixel of a display panel according to another embodiment of the invention.
Figure 3D:
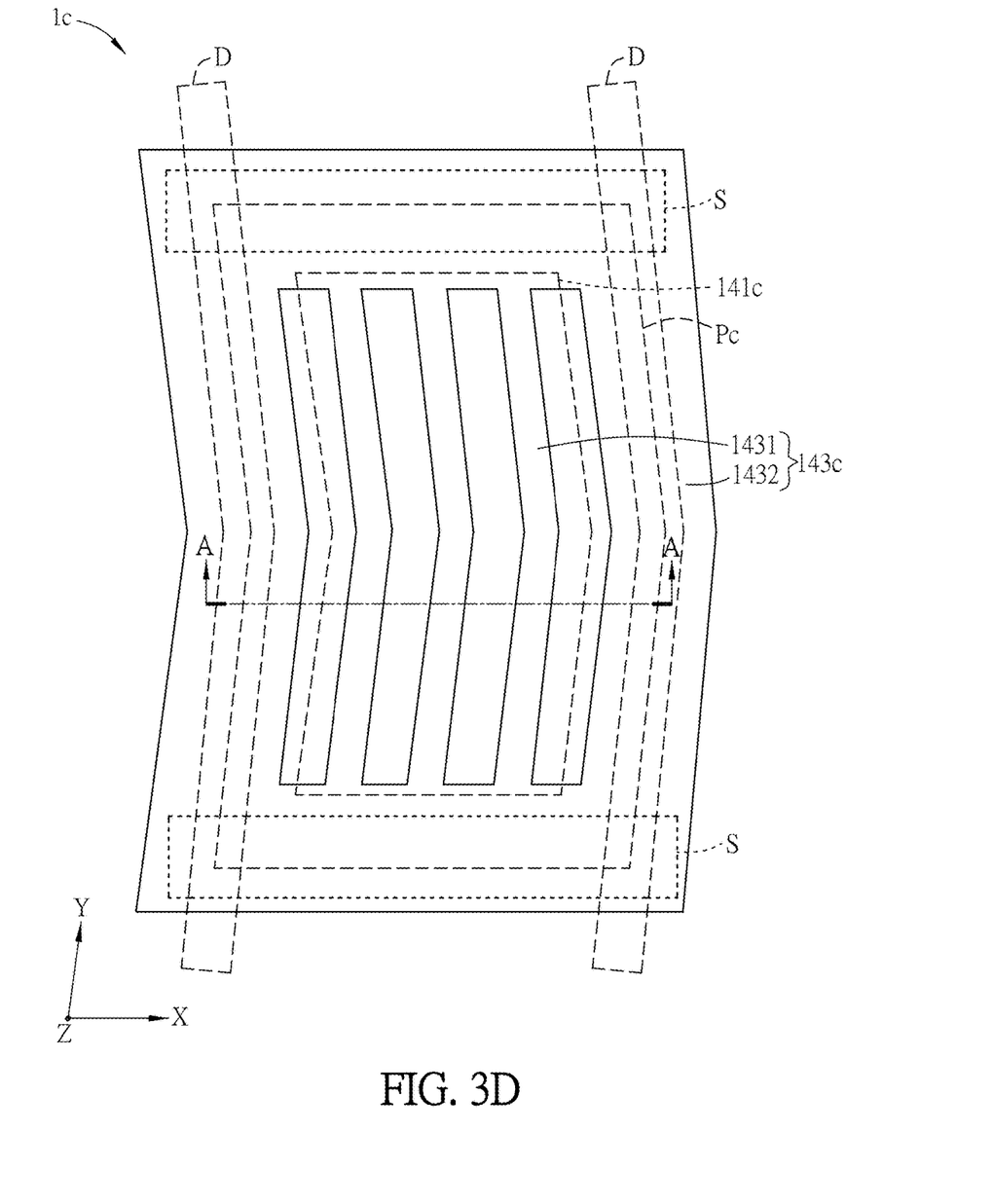
FIG. 3D is a schematic diagram of a pixel of a display panel according to another embodiment of the invention.

FIG. 3A is a schematic sectional diagram of a display panel 1a according to another embodiment of the invention, FIG. 3B is a schematic diagram of the second electrode layer 143a of the display panel 1a in FIG. 3A, FIG. 3C is a schematic diagram of a pixel Pb of a display panel 1b according to another embodiment of the invention, and FIG. 3D is a schematic diagram of a pixel Pc of a display panel 1c according to another embodiment of the invention.

As shown in FIG. 3A, mainly different from the display panel 1 in FIG. 1B, the first electrode layer 141 of the display panel 1a is a common electrode while the second electrode layer 143a is a pixel electrode. As shown in FIG. 3B, the second electrode layer 143a includes three electrode portions 1431 and a second connecting portion 1433, which is disposed on the opposite sides of the electrode portions 1431 and connected to the electrode portions 1431. As shown in FIG. 3A, the data line D is disposed on the first substrate 11, and the pixel Pa further includes another insulation layer 145 covering the data line D, so that the first electrode layer 141 is disposed between the insulation layer 142 and the insulation layer 145.

As shown in FIG. 3C, mainly different from the display panel 1 in FIG. 1A, the second direction Y of the display panel 1b is substantially parallel to the direction of the data line D but the first direction X and the second direction Y are not perpendicular to each other and form an obtuse angle, so that the pixel Pb is about a parallelogram. In other words, the scan lines S and the data lines D of the display panel 1b still cross each other but they are not perpendicular to each other and form an obtuse angle, so that each of the pixel Pb, the first electrode layer 141b and the second electrode layer 143b substantially has a shape of parallelogram.

As shown in FIG. 3D, mainly different from the display panel 1 in FIG. 1A, the data line D of the pixel Pc of the display panel 1c has a turning. Therefore, the pixel Pc is not a parallelogram but has a turning corresponding to the turning of the data line. Besides, the electrode portion 1431 and the first connecting portion 1432 of the second electrode layer 143c have turnings corresponding to the pixel Pc, and the first electrode layer 141c also has a turning correspondingly.

The other technical features of the display panels 1a, 1b, 1c can be comprehended by referring to the same elements of the display panel 1, and therefore they are not described here for conciseness.

Figure 4:
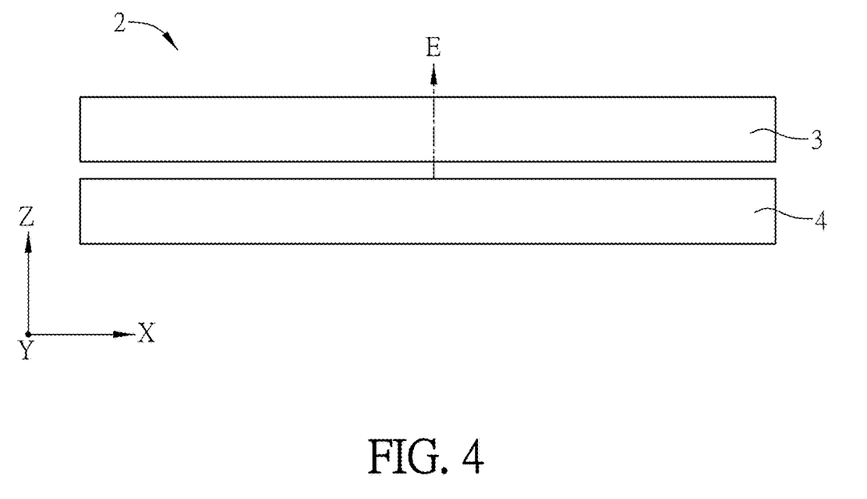
FIG. 4 is a schematic diagram of a display device according to an embodiment of the invention.

FIG. 4 is a schematic diagram of a display device 2 according to an embodiment of the invention.

As shown in FIG. 4, the display device 2 includes a display panel 3 and a backlight module 4 disposed opposite to the display panel 3. The display panel 3 can be anyone of the display panels 1, 1a, 1b and 1c and is not described here for conciseness. When the backlight module 4 emits the light passing through the display panel 3, the pixels of the display panel 3 can display colors and images accordingly.

Summarily, in the display panel and display device of the invention, the pixel array includes at least a pixel, and the insulation layer of the pixel is disposed between the first electrode layer and the second electrode layer. The second electrode layer has n electrode portions. The electrode portions are spaced from each other and disposed in parallel along the first direction, and the electrode width of one of the electrode portions along the first direction is denoted by W. The maximum width of the light-emitting area of the pixel along the first direction is denoted by Ax. The equation is satisfied as below:

$$\frac{1}{2} \times \left(\sqrt{\frac{10 \times Ax}{3 \times W}} - 1\right) - 1 \leq n \leq \frac{1}{2} \times \left(\sqrt{\frac{10 \times Ax}{3 \times W}} - 1\right) + 1$$

wherein, n is a positive integer.

Accordingly, when the number (n) of the electrode portions of the second electrode layer, the electrode width (W) and the maximum width (Ax) of the light-emitting area of the pixel along the first direction comply with the above equation, the ratio of the area of the dark regions to the area of the light-emitting area of the pixel can be minimized so as to obtain the maximum transmittance of the pixel. Therefore, the display panel and the display device of the invention can have a higher transmittance and the product competitiveness can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
a first substrate and a second substrate disposed opposite to the first substrate;
a liquid crystal layer disposed between the first and second substrates;
a scan line disposed on the first substrate and extending along a first direction; and
a pixel array disposed on the first substrate and including at least one pixel, wherein the at least one pixel includes a first electrode layer, a second electrode layer and an insulation layer disposed between the first and second electrode layers, the second electrode layer has n electrode portions, the electrode portions are disposed along the first direction, an electrode width of one of the electrode portions along the first direction is denoted by W (μm), a maximum width of a light-emitting area of the at least one pixel along the first direction is denoted by Ax (μm), and an equation is satisfied as below:

$$\frac{1}{2} \times \left( \sqrt{\frac{A_x}{3 \times W \times R}} - 1 \right) - 1 \leq n \leq \frac{1}{2} \times \left( \sqrt{\frac{A_x}{3 \times W \times R}} - 1 \right) + 1$$

wherein, n is a positive integer, R is greater than 0.05 and less than 0.1, and a unit of W and Ax is μm.

2. The display panel as recited in claim 1, wherein when a light passes through the at least one pixel, the at least one pixel has a brightness distribution along the first direction, and the maximum width of the light-emitting area of the at least one pixel along the first direction is a full width at half maximum (FWHM) of the brightness distribution.

3. The display panel as recited in claim 1, wherein the second electrode layer further includes a first portion, which surrounds the electrode portions and is connected to the electrode portions.

4. The display panel as recited in claim 1, wherein the second electrode layer further includes a second portion, which is disposed on opposite sides of the electrode portions and connected to the electrode portions.

5. A display device, comprising:
a display panel including a first substrate, a second substrate disposed opposite to the first substrate, a liquid crystal layer disposed between the first and second substrates, a scan line disposed on the first substrate and extending along a first direction, and a pixel array disposed on the first substrate and including at least one pixel, wherein the at least one pixel includes a first electrode layer, a second electrode layer and an insulation layer disposed between the first and second electrode layers, the second electrode layer has n electrode portions, the electrode portions are disposed along the first direction, an electrode width of one of the electrode portions along the first direction is denoted by W (μm), a maximum width of a light-emitting area of the at least one pixel along the first direction is denoted by Ax (μm), and an equation is satisfied as below:

$$\frac{1}{2} \times \left( \sqrt{\frac{A_x}{3 \times W \times R}} - 1 \right) - 1 \leq n \leq \frac{1}{2} \times \left( \sqrt{\frac{A_x}{3 \times W \times R}} - 1 \right) + 1$$

wherein, n is a positive integer, R is greater than 0.05 and less than 0.1, and a unit of W and Ax is μm.

6. The display device as recited in claim 5, further comprising a backlight module disposed adjacent to the display panel.

7. The display device as recited in claim 5, wherein when a light passes through the at least one pixel, the at least one pixel has a brightness distribution along the first direction, and the maximum width of the light-emitting area of the at least one pixel along the first direction is a full width at half maximum (FWHM) of the brightness distribution.

8. The display device as recited in claim 5, wherein the second electrode layer further includes a first portion, which surrounds the electrode portions and is connected to the electrode portions.

9. The display device as recited in claim 5, wherein the second electrode layer further includes a second portion, which is disposed on opposite sides of the electrode portions and connected to the electrode portions.

10. A display device, comprising:
a display panel including a first substrate, a second substrate disposed opposite to the first substrate, a liquid crystal layer disposed between the first and second substrates, a scan line disposed on the first substrate and extending along a first direction, and a pixel array disposed on the first substrate and including at least one pixel, wherein the at least one pixel includes a first electrode layer, a second electrode layer and an insulation layer disposed between the first and second electrode layers, the second electrode layer has at least one electrode portion, a number of the at least one electrode portion is denoted by n, an electrode width of one of the at least one electrode portion along the first direction is denoted by W (μm), a maximum width of a light-emitting area of the at least one pixel along the first direction is denoted by Ax (μm), and an equation is satisfied as below:

$$\frac{1}{2} \times \left( \sqrt{\frac{A_x}{3 \times W \times R}} - 1 \right) - 1 \leq n \leq \frac{1}{2} \times \left( \sqrt{\frac{A_x}{3 \times W \times R}} - 1 \right) + 1$$

wherein, n is a positive integer, R is greater than 0.05 and less than 0.1, and a unit of W and Ax is μm.

11. The display device as recited in claim 10, further comprising a backlight module disposed adjacent to the display panel.

12. The display device as recited in claim 10, wherein when a light passes through the at least one pixel, the at least one pixel has a brightness distribution along the first direction, and the maximum width of the light-emitting area of the at least one pixel along the first direction is a full width at half maximum (FWHM) of the brightness distribution.

13. The display device as recited in claim 10, wherein the second electrode layer further includes a first portion, which surrounds the electrode portions and is connected to the at least one electrode portion.

14. The display device as recited in claim 10, wherein the second electrode layer further includes a second portion, which is disposed on opposite sides of the at least one electrode portion and connected to the at least one electrode portion.

* * * * *